US 6,635,864 B2

(12) United States Patent
Hirst

(10) Patent No.: US 6,635,864 B2
(45) Date of Patent: Oct. 21, 2003

(54) MEASUREMENT AND CORRECTION OF A SCAN LINE LENGTH ERROR

(75) Inventor: B. Mark Hirst, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/905,277

(22) Filed: Jul. 13, 2001

(65) Prior Publication Data

US 2003/0015654 A1 Jan. 23, 2003

(51) Int. Cl.[7] .................................................. H01J 3/14

(52) U.S. Cl. ..................... 250/234; 347/250; 250/236

(58) Field of Search ................................. 250/234, 235, 250/236, 216; 359/197, 205, 216–221; 347/250

(56) References Cited

U.S. PATENT DOCUMENTS

| | | | | |
|---|---|---|---|---|
| 4,600,837 A | * | 7/1986 | DiStefano et al. | 250/235 |
| 4,950,889 A | | 8/1990 | Budd et al. | 250/236 |
| 5,278,405 A | * | 1/1994 | Zelenka | 250/235 |
| 5,281,812 A | * | 1/1994 | Lee et al. | 250/235 |
| 5,594,556 A | * | 1/1997 | Vronsky et al. | 358/482 |
| 6,355,926 B1 | * | 3/2002 | Hubble, III et al. | 250/214 R |
| 6,429,424 B1 | * | 8/2002 | Park | 250/236 |

* cited by examiner

Primary Examiner—Stephone B. Allen

(57) ABSTRACT

A method for determining a scan line error for a scan line, wherein the scan line is produced from one of a plurality of facets of a rotating reflector of a scanning device. The method comprises the steps of (a) determining a difference between a time of an occurrence of a point in a scan line produced from a first facet and a time of an occurrence of a point in a scan line produced from a second facet, and (b) determining from the difference, a scan line error for the scan line produced from the first facet.

21 Claims, 9 Drawing Sheets

MEASUREMENT AND CORRECTION OF A SCAN LINE LENGTH ERROR

FIELD OF THE INVENTION

The present invention relates to scanning devices and, more particularly, to the measurement and correction of a scan line length error, where the scan line is produced from a facet of a rotating reflector.

BACKGROUND OF THE INVENTION

Printing devices such as laser printers, digital photocopiers and fax machines use a laser beam to write an image on a photosensitive surface. The surface moves and the laser beam scans an image by sweeping in a direction perpendicular to that of the moving surface. This scanning action is similar to the movement of an electron beam across a television tube or other cathode ray tube (CRT). However, unlike a CRT, one dimension of the image, call it the Y dimension, is controlled by the movement of the surface, while the other dimension, call it the X dimension, is controlled by the scanning action of the laser.

Laser imaging devices implement the scanning action by reflecting a laser beam off a rotating reflective surface, typically a rotating mirror. The rotating mirror is a polygon typically having two or more faces called facets that reflect the laser beam. Mirrors with four, six or eight facets are not uncommon.

In a laser imaging system having a mirror with a plurality of facets, the quality of an image is affected by several factors related to the design and manufacture of the facets. One such factor is a radial runout of a polygon mirror after it is attached to a shaft of a drive motor. Radial runout is a total variation in a direction perpendicular to an axis of rotation of a reference surface from a surface of revolution. In this case, the reference surface is the motor shaft. Radial runout includes errors due to eccentricity and out-of-roundness.

An ideal system operates within the constraints listed below.
(1) In the case of an even-sided polygonal mirror, facets on opposite sides of the mirror are parallel to one another.
(2) The mirror has minimal runout relative to its rotational center.
(3) The angles formed by the facets of the polygon are precise.
(4) The motor and bearing system run true, without wobble.

A system that fails to meet these constraints can produce objectionable artifacts in a printed image. These artifacts are due to scan lines of different lengths.

In a system using a multi-facet mirror, successive facets of the mirror produce successive scan lines of the image. Thus, a specific facet of the rotating mirror produces specific scan lines. For example, a four-faceted mirror will produce scan lines as shown in Table 1, below.

TABLE 1

| Four-Faceted Mirror | |
| --- | --- |
| Facet Number | Scan Line Number |
| 1 | 1 |
| 2 | 2 |
| 3 | 3 |
| 4 | 4 |
| 1 | 5 |
| 2 | 6 |
| 3 | 7 |
| 4 | 8 |
| 1 | 9 |
| 2 | 10 |
| 3 | 11 |
| 4 | 12 |

Imperfections in the mirror facets can cause scan lines to be of different lengths. For example, all the scan lines written by a facet can be one length, while those written by another facet are a different length. Presently, scanners can produce scan lines with 300 or 600 dots per inch (DPI) that vary less than one dot per line. Nonetheless, even a minor difference in the length of a scan line can cause a periodic distortion in an image.

The beginning of each scan line is electronically synchronized to a starting margin of an image. The synchronizing signal is conventionally known as a "beam detect" (BD). A variation in the scan line accumulates over the length of the scan line and typically reaches its maximum at the end of the scan line.

An observer will usually not notice any variation in a single line. However, a periodic pattern produced by the variation in the scan line may interfere with a pattern of gray scale or halftones in an image, thus creating a moiré pattern. A moiré pattern typically appears as a periodic series of lines superimposed over the image. Even though differences in the lengths of the scan lines are less than one dot wide, the human vision system is very sensitive to moiré patterns and it can detect errors of less than the width of one dot. For example, a human can detect a moiré pattern caused by a ¼ dot error in an image produced by a 600 DPI printer. As laser printers are called upon to print images approaching photograph quality, gray scale and halftone patterns are used more frequently, and the resulting images are more susceptible to moiré.

Methods exist that compensate for scanner imperfections by lengthening or shortening the lines produced by the facets until each line is the same length. A system applying such a method requires knowledge of (1) the amount of facet-to-facet imperfection, and (2) which facet of the mirror is reflecting the laser beam.

Knowledge of the amount of facet-to-facet imperfection is used to determine how much compensation is required for a particular facet. A facet error can be characterized in terms of the time it takes to sweep a beam across a predetermined length. For example, a 600 DPI printer that prints a line across an eight-inch page prints 4800 dots.

$$4800 \text{ dot} = 600 \text{ dots/inch} \times 8 \text{ inches}$$

A particular model of printer may print a dot in 50 nanoseconds (ns). Thus an eight-inch line would be printed in 240 microseconds ($\mu s$).

$$240 \ \mu s = 4800 \text{ dots} \times 50 \text{ ns/dot}$$

If the nominal scan line is 240 $\mu s$ long, then a scanner imperfection that causes a scan line length of 240.050 $\mu s$ corresponds to a length of one extra dot. A scan line length of 239.950 corresponds to a line that is one dot shorter than the nominal line. As humans can detect moiré patterns caused by a ¼ dot error, a facet-to-facet deviation of 12.5 ns can result in a noticeable imaging artifact.

Knowledge of which facet of the mirror is reflecting the laser beam is necessary so that an appropriate compensation can be applied when a particular facet is producing a scan line. The scan line lengths are corrected on a facet-by-facet basis so that all the resulting printed lines on the page are the same lengths. The correction for a scan line is achieved by shifting the time at which a pixel is printed, thus resulting in a shift of the point at which the pixel is printed so that adjacent raster lines are aligned with one another. For example, a pixel at row 5, column 400 will properly align with a pixel at row 6, column 400.

One technique for characterizing a scanner involves the use of a test fixture to measure and record the scan line length of each facet. This information is either physically written onto the scanner, or stored into an electronic memory that is included with the scanner. The information is subsequently recalled during a line length correction procedure. Because the measurement is made external to the scanner system, this technique requires additional manufacturing steps for the characterization process, and further requires a step for a transfer of the characterization information from the scanner to a compensation circuit. Both steps add to the cost of the scanner in terms of handling in order to perform the measurement, as well as in hardware such as cables, connectors and memory circuitry for storage of the measured values.

Systems exist in which a scan line length is measured in real-time as a scan line is produced from a facet. A first sensor is located to detect a beginning of the scan line, and a second sensor is located to detect the end of the scan line. The scan line length is the interval of time that elapses between detection of the beginning and the end of the scan line. Such a system includes circuitry and wiring to support the two sensors. Conventionally, a line length correction is thereafter based on the difference between the actual length of the line and a desired, ideal length of the line without considering the lengths of the scan lines relative to one another. A system performing real-time measurement would benefit from an improvement that reduces circuitry and/or improves resolution. Also, if the correction were made by adjusting the line lengths relative to a line length of a reference facet, rather than to a desired, ideal length, then at least one less correction would need to be made since no correction would be required for the reference facet.

An existing technique for identifying which facet of a mirror is reflecting the laser beam is to tag one facet so that a sensor can detect the tagged facet. For example, the tag might be a physical mark that is sensed optically. Assume that facet #1 is tagged. The sensor will detect facet #1, and thereafter a beam detect circuit counts subsequent facets until the mirror makes a full rotation bringing facet #1 into printing position again. Disadvantageously, this technique requires a means for tagging a facet, a sensor for detecting the tag and wiring to communicate the facet information to the compensation circuitry. Also, when a system uses a counter to keep track of which facet is producing a scan line, the count must cycle based on the number of facets on, or the modulo number of, the polygon mirror. Conventional systems are therefore limited to operating with a scanning device having a particular, predetermined number of facets.

Accordingly, there is a need for a scanning device of reduced cost and complexity that can detect both a beginning and an end of a scan line with a single detector.

There is also a need for an improved method for determining a scan line length correction for each of the facets of a polygon mirror.

Furthermore, there is a need for a method for determining a modulo number that indicates a number of facets on a polygon mirror in a scanning device.

SUMMARY OF THE INVENTION

A first method of the present invention determines a scan line error for a scan line, wherein the scan line is produced from one of a plurality of facets of a rotating reflector of a scanning device. The method comprises the steps of (a) determining a difference between a time of an occurrence of a point in a scan line produced from a first facet and a time of an occurrence of a point in a scan line produced from a second facet, and (b) determining from the difference, a scan line error for the scan line produced from the first facet.

A second method of the present invention determines a correction for a scan line, wherein the scan line is produced from one of a plurality of facets on a rotating reflector of a scanning device. The method comprises the steps of (a) determining a facet error from a difference between a length of a scan line produced from a first facet and a length of a scan line produced from a second facet, and (b) determining from the facet error, a correction for the scan line produced from the first facet.

A third method of the present invention determines a modulo number that indicates a number of facets on a rotating polygon mirror of a scanning device. The polygon mirror has a plurality of facets. The method comprises the steps of: (a) acquiring N consecutive scan line lengths produced from the plurality of facets, where N is an integer substantially greater than an expected value of the modulo number, (b) calculating an average scan line length from the N scan line lengths, (c) calculating a set of error values for the N scan line lengths, through use of each of the N scan line lengths and the average scan line length, (d) determining from the set of error values an index X to a peak error value, and an index Y to a subsequent occurrence of a further peak error value, and (e) determining the modulo number from a difference between Y and X. A system is also provided to perform this method.

An embodiment of the present invention provides for an apparatus for detecting a first point and a second point of a scan line that is produced by a light beam reflected from a facet of rotating reflector. The light beam travels from the facet along a first path to the first point, and the light beam travels from the facet along a second path to the second point. The apparatus comprises: (a) a detector located in the first path for detecting the light beam, and (b) a mirror located in the second path for reflecting the light beam toward the detector. The detector produces a signal when the light beam is incident at the first point or incident at the second point.

DETAILED DESCRIPTION OF THE PREFERRED EMBODIMENTS

Figure 1A:
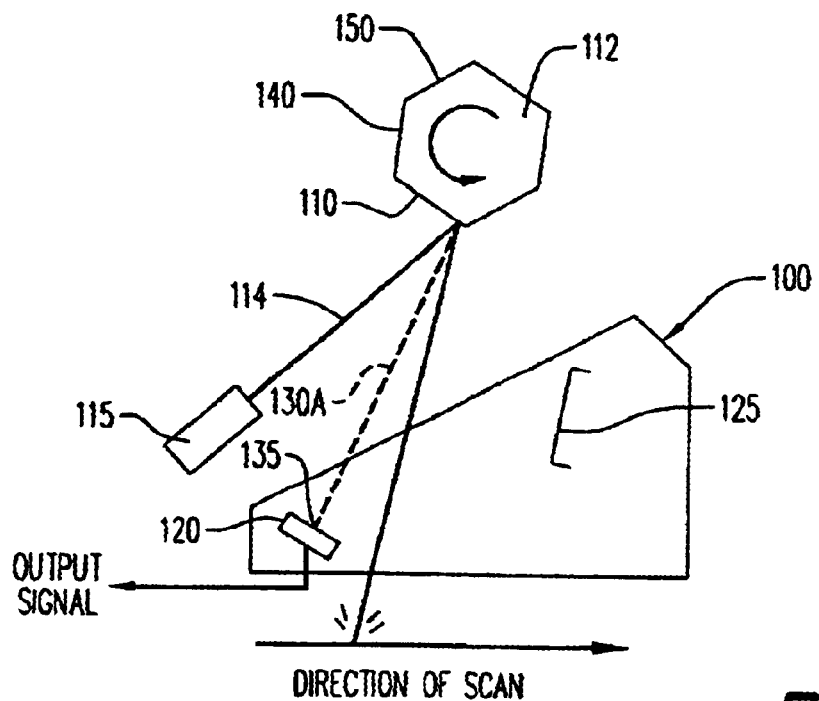
FIGS. 1A and 1B are diagrams of an apparatus for detecting a first point and a second point of a scan line using a single detector in accordance with the present invention.

Throughout the following description, similar reference numerals refer to similar elements in all figures of the drawings.

Figure 1B:
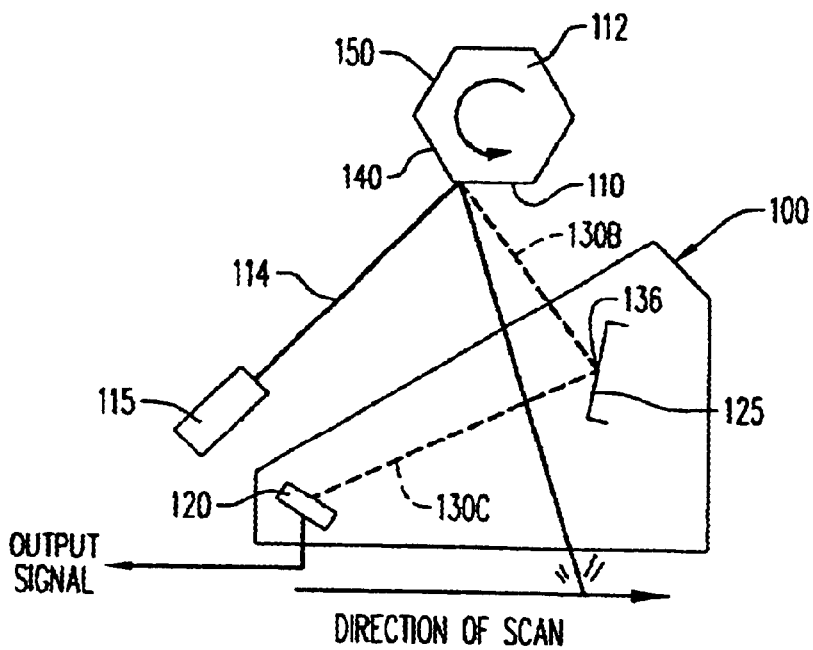

FIGS. 1A and 1B are diagrams of an apparatus 100 for detecting a first point 135 and a second point 136 of a scan line using a single detector. The scan line is produced by a light beam 114 reflected from a facet 110, which is one of a plurality of facets on a rotating polygon mirror 112. Facets 140 and 150 are also represented. When polygon mirror 112 rotates in a counterclockwise direction, facet 110 produces a scan line that moves from left to right. At the leading edge of the scan line, the light beam travels from facet 110 along a first path 130A to the first point 135. At the trailing edge of the scan line, the light beam travels from facet 110 along a second path 130B to the second point 136.

Apparatus 100 includes a detector 120 and a mirror 125. Detector 120 is a photo sensor located in the first path 130A for detecting the light beam. Mirror 125, which is located in the second path 130B, reflects the light beam toward detector 120 along path 130C.

When the light beam illuminates detector 120, detector 120 produces an output signal. It therefore produces the signal when the light beam is incident at the first point 135 or incident at the second point 136.

In a practical implementation, the first point 135 indicates a start of a scan line and the second point 136 indicates an end of the scan line. Accordingly, a circuit that receives the output signal from detector 120 can measure an interval of time between consecutive occurrences of the signal to determine the length of the scan line. A single detector apparatus, such as those shown in FIGS. 1A and 1B can generally be produced for a lower cost than a circuit that requires two detectors.

Figure 2:
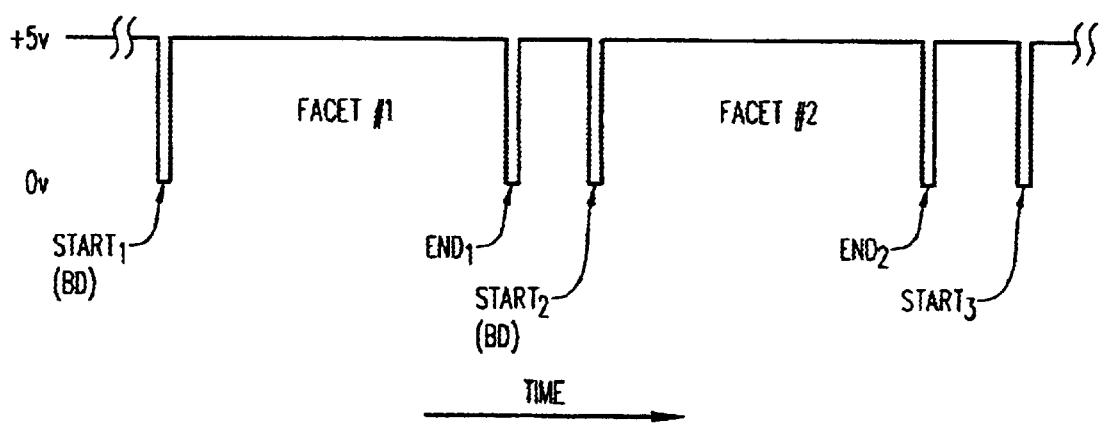
FIG. 2 is a timing diagram of a signal produced by the apparatus of FIGS. 1A and 1B showing relative timing intervals between a start and an end of a first scan line, and a start and an end of a second scan line.

FIG. 2 is a timing diagram of the output signal produced by detector 120 in FIGS. 1A and 1B, for a polygon mirror having a plurality of facets. Assume for example that facet 110 in facet #1, facet 140 is facet #2, and facet 150 is facet #3. The diagram includes pulses $Start_1$, $End_1$, $Start_2$, and $End_2$:

where:

$Start_1$=start of a line produced by facet #1;
$End_1$=end of the line produced by facet #1;
$Start_2$=start of a line produced by facet #2; and
$End_2$=end of the line produced by facet #2.

The interval of time from $Start_1$ to $End_1$ provides the scan line length of the line produced by facet #1. Likewise, the interval of time from $Start_2$ to $End_2$ provides the scan line length of the line produced by facet #2. The interval from $End_1$ to $Start_2$ is a setup time during which the mirror rotates to bring facet #2 into its printing position.

In a conventional scanner, the interval of time between a start signal and an end signal of a facet is on the order of 240 $\mu s$, and the interval between an end of a scan and the start of a next scan is typically of the order of 120 $\mu s$. Note that the interval of time from $Start_1$ to $End_1$, e.g., typically 240 $\mu s$, is significantly greater than the interval between $End_1$ and $Start_2$, e.g., typically 120 $\mu s$. An interval representing a scan line is distinguishable from a setup interval based on the significant difference in the duration of the two intervals. Accordingly, a circuit receiving the signal from detector 120 can measure an interval of time between consecutive occurrences of the signal to distinguish between a scanning interval and a setup interval, and to determine the length of the scan line produced from a facet.

Figure 9:
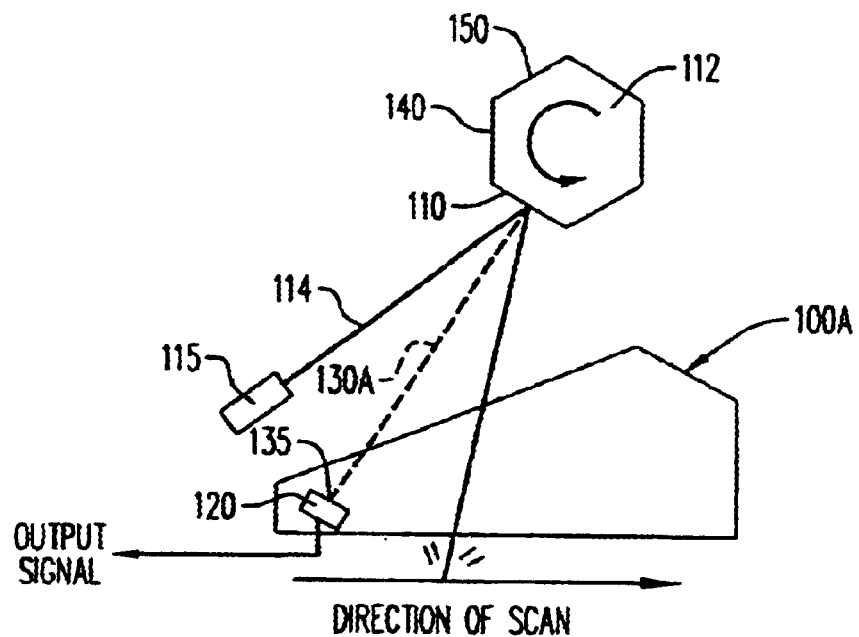
FIG. 9 is a diagram of an apparatus for detecting a point of a scan line using a single detector in accordance with the present invention.

FIG. 9 is a diagram of an apparatus 100A for detecting a point 135 on a scan line using a single detector. Similarly to the apparatus of FIGS. 1A and 1B, the scan line is produced by a light beam 114 reflected from a facet, in this case facet 110, which is one of a plurality of facets on a rotating polygon mirror 112. Facets 140 and 150 are also illustrated. When polygon mirror 112 rotates in a counterclockwise direction, facet 110 produces a scan line that moves from left to right. At some time during production of the scan line, for example, at the leading edge of the scan line, the light beam travels from facet 110 along a first path 130A to point 135.

Apparatus 100 A includes a detector 120. Detector 120 is a photo sensor located in path 130A for detecting the light beam. When the light beam illuminates detector 120, detector 120 produces an output signal. It therefore produces the signal when the light beam is incident at point 135.

In a practical implementation, point 135 may indicate a start of a scan line. Accordingly, a circuit that receives the output signal from detector 120 can measure an interval of time between consecutive occurrences of the signal, and thus, the start time between consecutive scan lines.

Figure 10:
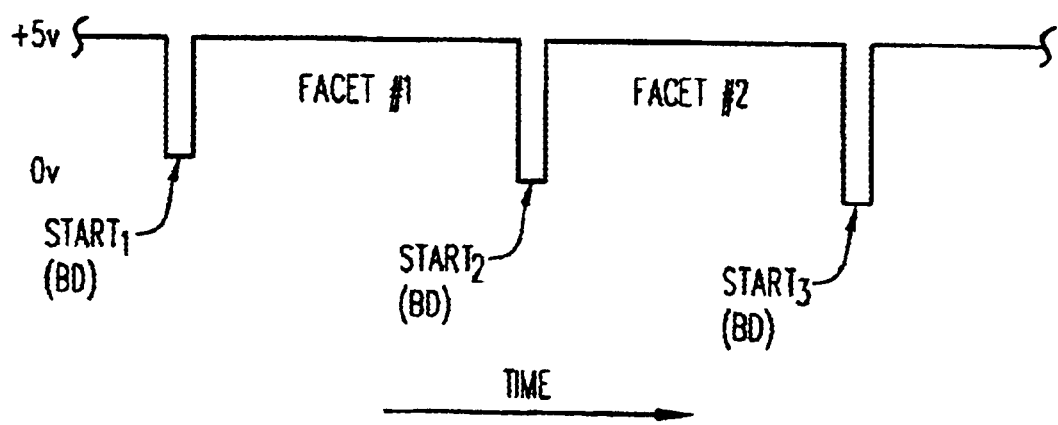
FIG. 10 is a timing diagram of a signal produced by the apparatus of FIG. 9 showing timing intervals between a start of a first scan line, a start of a second scan line and a start of a third scan line.

FIG. 10 is a timing diagram of the output signal produced by detector 120 in FIG. 9. Assume for example that facet 110 in facet #1, facet 140 is facet #2, and facet 150 is facet #3. The diagram includes pulses $Start_1$, $Start_2$ and $Start_3$, each of which correspond to a starting beam detect:

where: $Start_1$=start of a line produced by facet #1;
$Start_2$=start of a line produced by facet #2; and
$Start_3$=start of a line produced by facet #3

The interval of time from $Start_1$ to $Start_2$ is the time required to produce a scan line from facet #1, i.e., facet 110, and to further rotate polygon mirror 112 into position to produce a scan line from facet #2, i.e., facet 140. Likewise, the interval of time from $Start_2$ to $Start_3$ is the time required to produce the scan line from facet #2 and to further rotate polygon mirror 112 into position to produce a scan line from facet #3, i.e., facet 150. In a conventional scanner, the interval of time between start signals from consecutive facets is typically on the order of 360 $\mu s$.

A single detector apparatus that senses only the starting beam detects offers several advantages over prior art systems that use one detector for sensing the start of a scan and a second detector for sensing the end of the scan. For the two detector systems of the prior art, a timer must measure the interval between a Start and an End signal, e.g. 240 µs. In the apparatus of FIG. 9, the interval for collecting timing information is 360 µs. Therefore, for similar accuracy in measuring scan length errors, a circuit using the output signal from the apparatus of FIG. 9 can use a clock of ⅔ the speed of a conventional, two-detector system. For example, if a circuit requires a clock frequency of 1 GHz when employing a conventional, two-detector apparatus, the circuit can use a clock frequency of 666.67 MHz when employing the apparatus of FIG. 9. This can have a significant impact on cost as well as on radio frequency containment issues.

Figure 3:
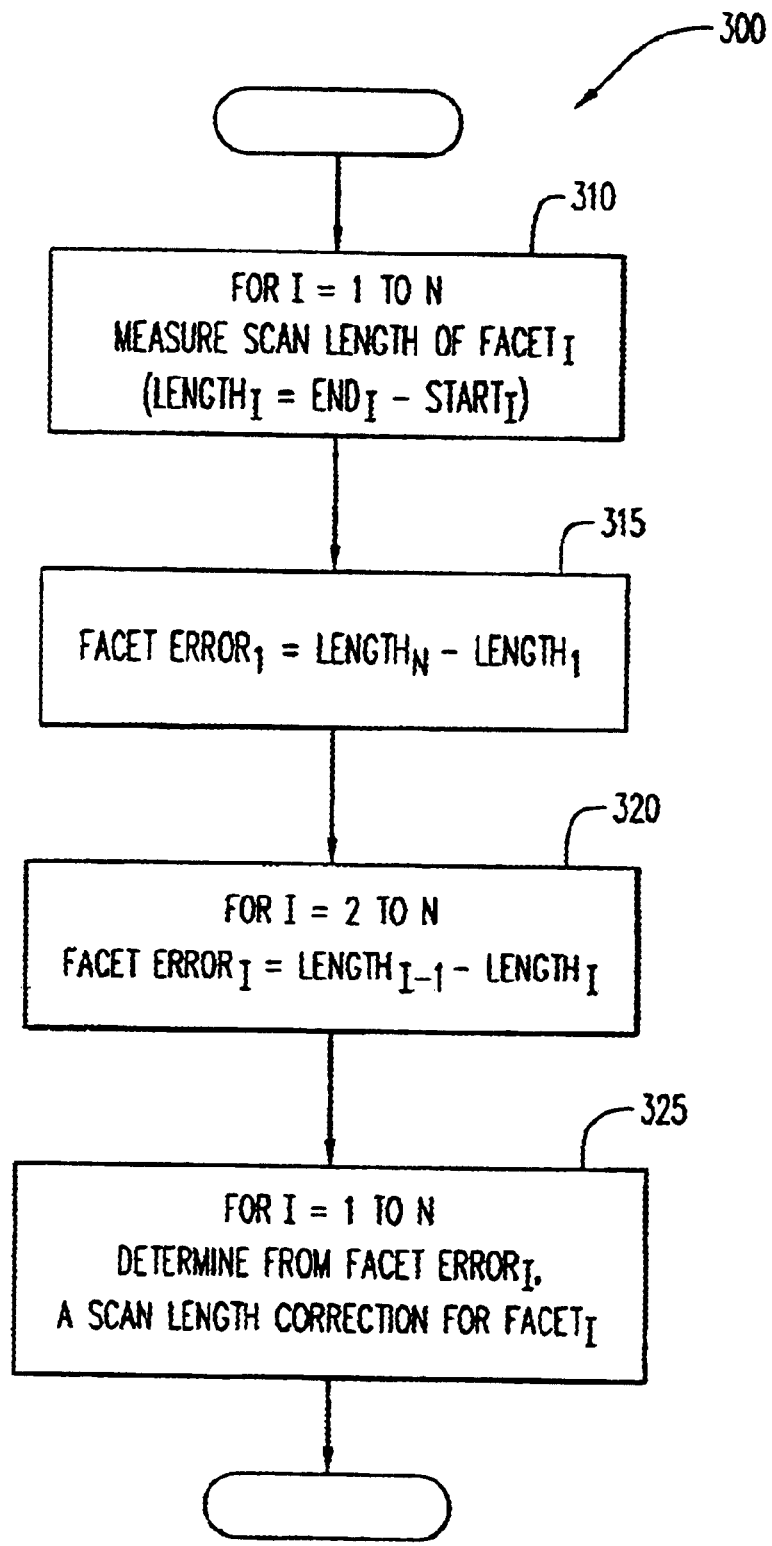
FIG. 3 is a flowchart of a method for determining a scan line length correction for each of the facets of a polygon mirror based on the relative lengths of the scan lines produced by the facets, in accordance with the present invention.

FIG. 3 is a flowchart of a method 300 for determining a correction for a scan line error. The scan line is produced from one of a plurality of facets on a rotating reflector of a scanning device. Method 300 considers the relative lengths of the scan lines produced by the facets. Using relative facet error data permits greater resolution of a length compensation circuit because a time difference between a length of given facet and a length of its preceding or succeeding, i.e., adjacent, facet is much greater than a timing error between the length of the given facet and a desired ideal time.

As described below, method 300 includes the steps of (a) determining a facet error from a difference between a length of a scan line produced from a first facet and a length of a scan line produced from a second facet, and (b) determining from the facet error, a correction for the scan line produced from the first facet. Assume that the mirror has N facets. The method begins with step 310.

In step 310, for each of the N facets on the mirror, measure a scan line length. A scan line length for a facet is determined from a difference between an end time of the scan line and a start time of the scan line. That is, $$Length_I = End_I - Start_I$$

In the case of a mirror with four facets, $$Length_1 = End_1 - Start_1$$
$$Length_2 = End_2 - Start_2$$
$$Length_3 = End_3 - Start_3$$
$$Length_4 = End_4 - Start_4$$

The method then advances to step 315.

In step 315, determine a facet error for facet #1. The facet error for facet #1 is found from a difference between the scan line length of a line produced from facet #1, and the scan line length of a line produced from the $N^{th}$ facet. That is, $$Error_1 = Length_N - Length_1$$

Note that the $N^{th}$ facet is adjacent to facet #1. In the case of a mirror with four facets, $$Error_1 = Length_4 - Length_1$$

If facet #1 is the facet with the longest length, then it will have a negative facet error. However, if it is the reference facet, it is not necessary to compute its error. All other errors from facet to facet are cumulative from the reference facet, e.g., facet #1. The method then advances to step 320.

In step 320, for each of facet #2 through facet #N, determine a facet error. The facet error for a facet is found from a difference between the scan line length of a line produced from the facet, and the scan line length of a line produced from the previous adjacent facet. That is, $$Error_I = Length_{I-1} - Length_I$$

In the case of a mirror with four facets, $$Error_2 = Length_1 - Length_2$$
$$Error_3 = Length_2 - Length_3$$
$$Error_4 = Length_3 - Length_4$$

The method then advances to step 325.

In step 325, for each of the N facets, determine a scan line length correction for the facet. One technique for determining the line length correction is to find the facet having the longest sweep time and use it as a reference. The sweep times for the other facets are thereafter extended to match the time of the reference facet.

For example, assume that facet #1 is the facet with the longest sweep time. As shown below, if facet #1 is chosen as a reference facet, then a correction for facet #2 is merely Facet $Error_2$. This correction value is used to adjust a temporal placement, and therefore a spatial placement, of pixels in the scan for facet #2. The corrected lengths for each of the facets is:

$$Corrected\ Length_2 = Length_1 + Error_2$$
$$Corrected\ Length_3 = Length_3 + Error_3 + Error_2$$
$$Corrected\ Length_4 = Length_1 + Error_4 + Error_3 + Error_2$$

Correction factors can be used to scale the clocks for each subsequent scan line after the reference facet.

$$Clock_2 = Clock_1(1 + Error_2/Length_1)$$
$$Clock_3 = Clock_1(1 + (Error_3 + Error_2)/Length_1)$$
$$Clock_4 = Clock_1(1 + (Error_4 + Error_3 + Error_2)/Length_1)$$

Method 300 also contemplates obtaining a number from a cyclic counter to identify the facet. The cycle period, or modulo, of the counter is related to the number of facets on the mirror. The relationship between the output of the counter and the facet that is producing the scan line is arbitrary. But such a relationship, once established, is consistent. The scan line length is associated with the facet when determining the facet error in steps 315 and 320. Furthermore, the output of the cyclic counter is used to indicate when a particular facet is producing a line, so that an appropriate correction is recalled and applied for that facet.

In practice, the modulus may be the same number as, or one-half the number of, the number of facets on the mirror. For example, if there are six facets on a polygon mirror, the modulo number may be either six or three. If the modulo is three, then less circuitry is required to store the facet error data, and if the correction is performed in microcontroller firmware, then only half as much storage is required for the correction data.

Figure 4:
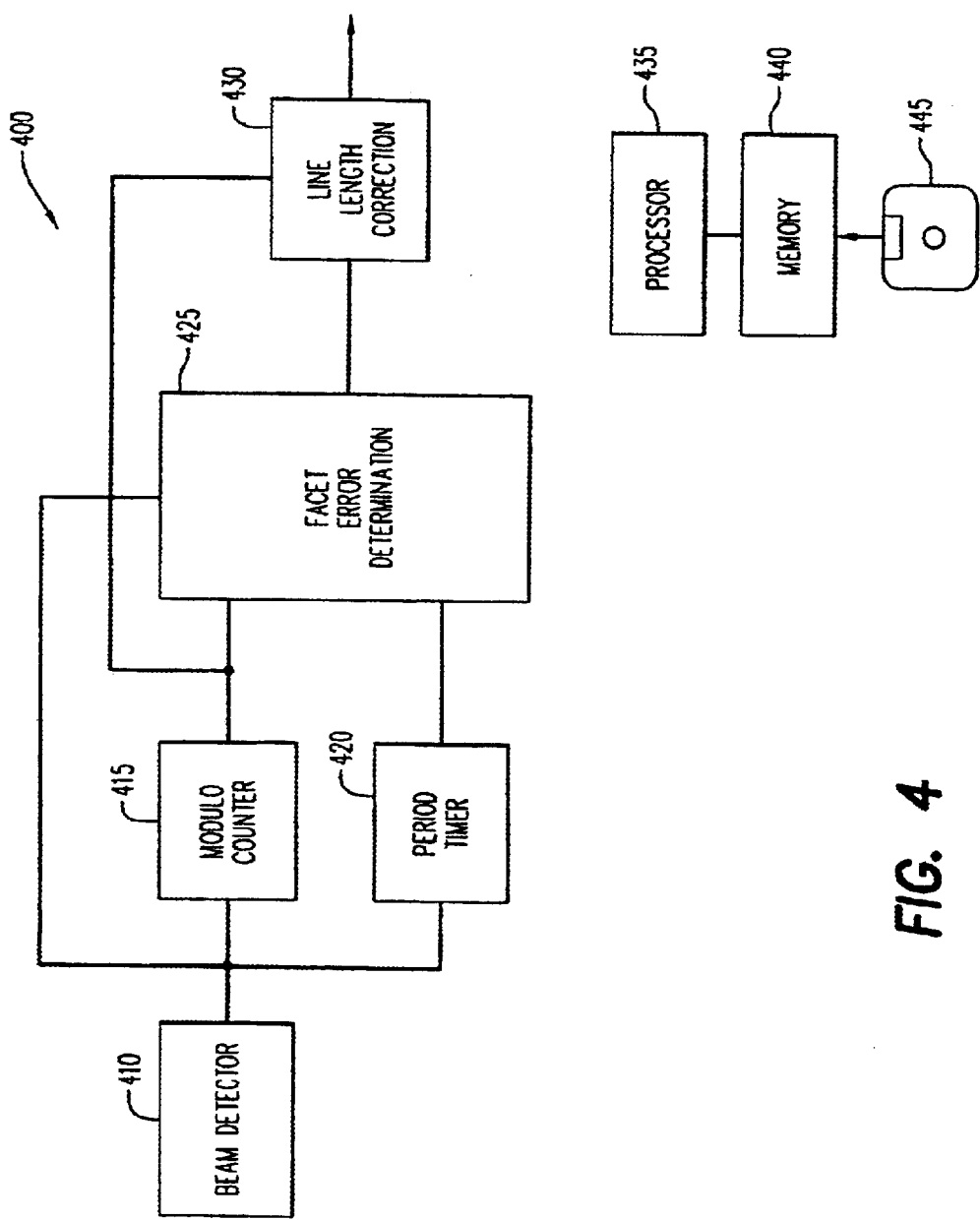
FIG. 4 is a block diagram of a system for determining a scan line length correction by employing the method illustrated in FIG. 3.

FIG. 4 is a block diagram of a system 400 for determining a scan line length correction by employing the method illustrated in FIG. 3. The scan line is produced from one of a plurality of facets on a rotating polygon mirror of a scanning device. As described below, such a system includes modules for: (a) determining a facet error from a difference between a length of a scan line produced from a first facet and a length of a scan line produced from a second facet, and (b) determining from the facet error, a correction for the scan line produced from the first facet.

System 400 includes a beam detector 410, a modulo counter 415, a period timer 420, a facet error determination circuit 425, and a line length correction circuit 430.

Beam detector 410 detects a light beam that produces a scan line, and provides an output signal to indicate a start and an end of the scan line. In a preferred embodiment, it is an apparatus such as that described above in association with FIGS. 1A and 1B. The output signal from beam detector 410 is routed to modulo counter 415, period timer 420, and facet error determination circuit 425.

Modulo counter 415 is a cyclic counter with a modulus that is the same as the number of facets on the mirror. It receives the signal from beam detector 410, and advances its count as the mirror rotates to a next facet. It thereby indicates when a particular facet is producing a line. The output of modulo counter 415 is a facet identification number that is routed to facet error determination circuit 425 and line length correction circuit 430.

Period timer 420 receives the signal from beam detector 410. It determines a scan line length produced from a facet from a difference between an end time of the scan line and a start time of the scan line. Period timer 420 provides the scan line length to facet error determination circuit 425.

Facet error determination circuit 425 receives the signal from beam detector 410, the facet identification number from modulo counter 415, and the scan line length from period timer 420. The signal from beam detector 410 alerts facet error determination circuit 425 that a facet has completed producing a scan line. Facet error determination circuit 425 uses the facet identification number to associate the scan line length with the facet. For each of the facets, it determines a facet error from a difference between a scan line length produced from a facet and a scan line length produced from an adjacent facet. Generally, $$\text{Facet Error}_I = \text{Length}_{I-1} - \text{Length}_I$$

The facet error is routed from facet error determination circuit 425 to line length correction circuit 430.

Line length correction circuit 430 receives the facet identification number from modulo counter 415, and the facet error from facet error determination circuit 425. It determines a scan line length correction for the facet as described earlier for FIG. 3. step 325. This process is executed for each of the facets on the mirror. Furthermore, since the facet identification number from modulo counter 415 indicates when a particular facet is producing a line, an appropriate correction is recalled and applied to compensate for the line error of the particular facet when the facet is producing a scan line. This operation can be performed continuously after starting if it is necessary to compensate for oscillation of the polygon motor speed. However, in a typical system this is not necessary as the motor speed control is very stable. The dominating factor in moiré patterns is the error in facet to facet scanning.

System 400 can be implemented in hardware using discrete components or firmware. Alternatively, it can be implemented in software and stored into a memory 440 for execution by a processor 435. Furthermore, the procedures required to execute the present invention may be configured on a storage medium, such as storage media 445, for subsequent loading into memory 440. Storage media 445 can be any conventional storage media such as a magnetic tape, an optical storage media, a compact disk, or a floppy disk.

Figure 5:
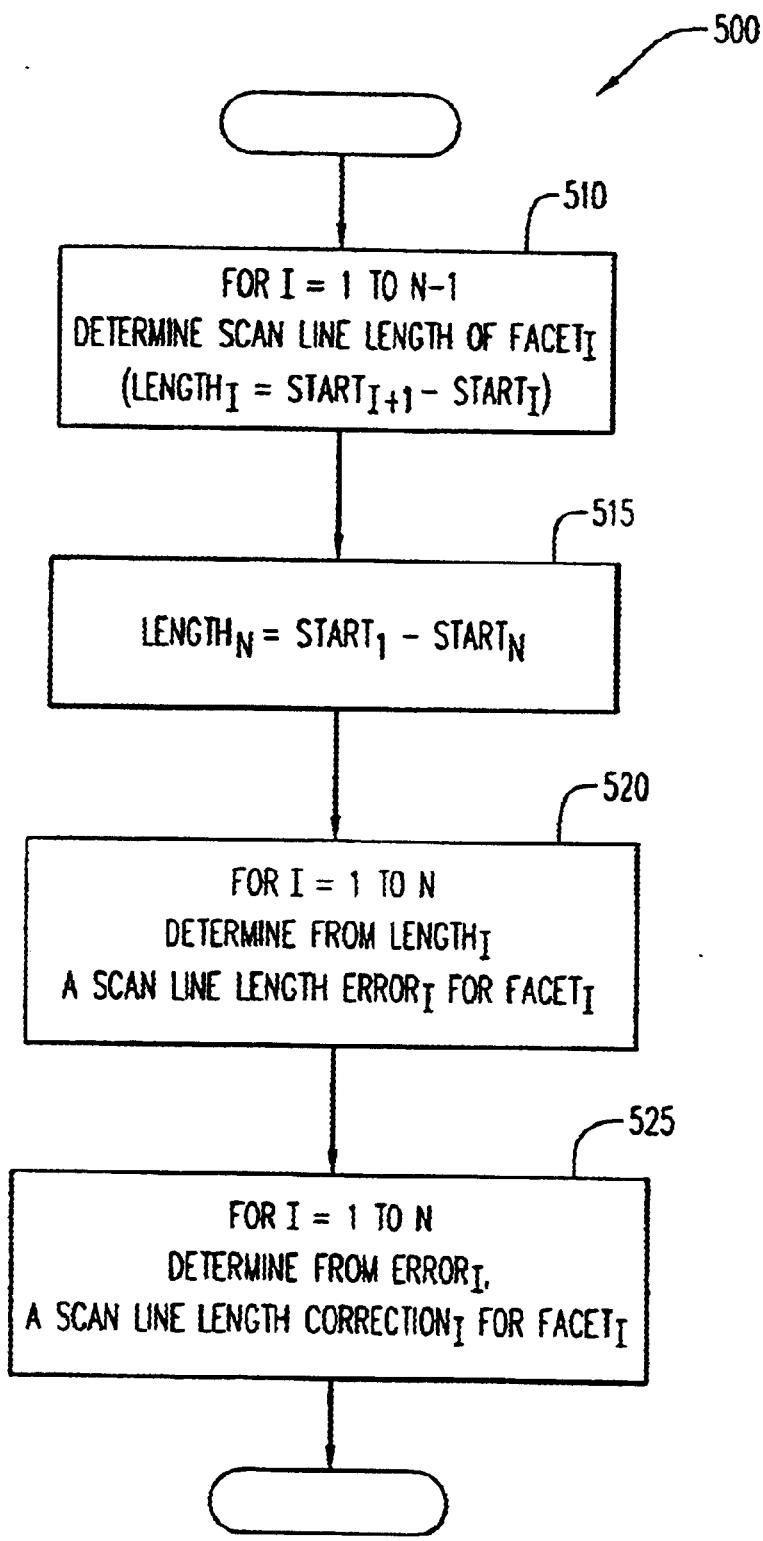
FIG. 5 is a flowchart of a method for determining a scan line length correction for a facet based on a difference between the start times of consecutive scan lines, in accordance with the present invention.

FIG. 5 is a flowchart of a method 500 for determining a scan line error for a scan line based on a difference between the start times of consecutive scan lines. The scan line is produced from one of a plurality of facets on a rotating reflector of a scanning device. As described below, method 500 includes the steps of: (a) determining a difference between a time of an occurrence of a point in a scan line produced from a first facet and a time of an occurrence of a point in a scan line produced from a second facet, and (b) determining from the difference, a scan line error for the scan line produced from the first facet. Thereafter, the method determines from the scan line error for the scan line produced from the first facet, a correction for the scan line produced from the first facet. Assume that the mirror has N facets. The method begins with step 510.

In step 510, for each of facet #1 through facet #N−1, determine a scan line length of the facet. Here, the scan line length of a facet is determined from a difference between a start time of a scan line produced from the facet, and a start time of a scan line produced from a next facet. That is, $$\text{Length}_I = \text{Start}_{I+1} - \text{Start}_I$$

In a case of a mirror with four facets, N=4, $$\text{Length}_1 = \text{Start}_2 - \text{Start}_1$$

$$\text{Length}_2 = \text{Start}_3 - \text{Start}_2$$

$$\text{Length}_3 = \text{Start}_4 - \text{Start}_3$$

In the implementation described herein, the start time of each scan line is detected. However, the lengths of the scan lines may be determined by detecting any convenient point in the scan lines. For example, the length may be determined by detecting an interval of time from the end of a first scan line to an end of a second scan line, or by detecting an interval of time from a middle of a first scan line to a middle of a second scan line. The method then advances to step 515.

In step 515, determine the scan line length of facet #N. That is, $$\text{Length}_N = \text{Start}_1 - \text{Start}_N$$

Note that the $N^{th}$ facet is adjacent to facet #1. In the case of a mirror with four facets, $$\text{Length}_4 = \text{Start}_4 - \text{Start}_1$$

The method then advances to step 520.

In step 520, for each of facet #1 through facet #N, determine a scan line length error from the scan line length of the facet.

$$\text{Error}_1 = \text{Length}_4 - \text{Length}_1$$

$$\text{Error}_2 = \text{Length}_1 - \text{Length}_2$$

$$\text{Error}_3 = \text{Length}_2 - \text{Length}_3$$

$$\text{Error}_4 = \text{Length}_3 - \text{Length}_4$$

Correction factors can be used to scale the clocks for each subsequent scan line after the reference facet.

$$\text{Clock}_2 = \text{Clock}_1(1 + \text{Error}_2/\text{Length}_1)$$

$$\text{Clock}_3 = \text{Clock}_1(1 + (\text{Error}_3 + \text{Error}_2)/\text{Length}_1)$$

$$\text{Clock}_4 = \text{Clock}_1(1 + (\text{Error}_4 + \text{Error}_3 + \text{Error}_2)/\text{Length}_1)$$

In step 525, for each of facet #1 through facet #N, determine a scan line length correction from the scan line length error of the facet. In one technique, as described earlier for FIG. 3, step 325, the facet with the longest sweep time is found and used as a reference, and thereafter, the sweep times for the other facets are extended to match the time of the reference facet.

Method 500 also contemplates obtaining a number from a cyclic counter to identify the facet. The cycle period, or modulo, of the counter coincides with the number of facets on the mirror. The relationship between the output of the counter and the facet that is producing the scan line is arbitrary. But such a relationship, once established, is consistent. The scan line length is associated with the facet when determining the facet error in steps 510 and 515. Furthermore, the output of the cyclic counter is used to indicate when a particular facet is producing a line, so that an appropriate correction is recalled and applied for that facet. Since the relationship between the output of the counter and a particular facet is arbitrary, no indicator or sensor is required to identify any particular facet. Accordingly, a system employing this method enjoys a reduced cost as compared to a system that does require such an indicator and sensor to identify a particular facet.

Figure 6:
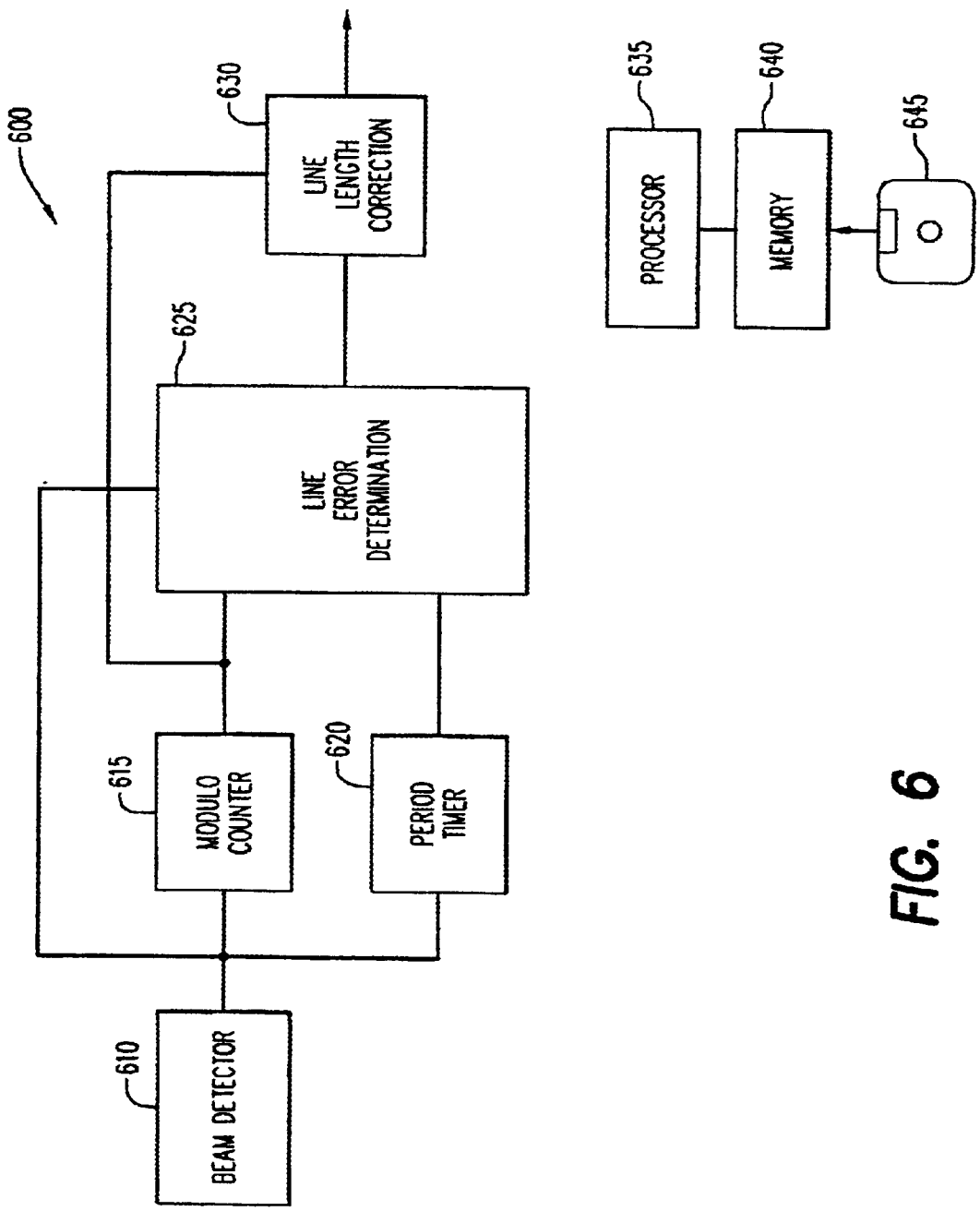
FIG. 6 is a block diagram of a system for determining a scan line length correction by employing the method illustrated in FIG. 5.

FIG. 6 is a block diagram of a system 600 for determining a scan line length correction by employing the method illustrated in FIG. 5. System 600 may employ the method periodically, as part of a maintenance routine, or at the initiation of a print job. The scan line is produced from one of a plurality of facets on a rotating polygon mirror of a scanning device. As described below, such a system includes modules for: (a) determining a difference between a time of an occurrence of a point in a scan line produced from a first facet and a time of an occurrence of a point in a scan line produced from a second facet, and (b) determining from the difference, a scan line error for the scan line produced from the first facet.

System 600 includes a beam detector 610, a modulo counter 615, a period timer 620, a line error determination circuit 625, and a line length correction circuit 630.

Beam detector 610 detects a light beam that produces a scan line, and provides an output signal to indicate a start of the scan line. In a preferred embodiment, it is an apparatus such as that described above in association with FIGS. 1A and 1B, or FIG. 9. The output signal from beam detector 610 is routed to modulo counter 615, period timer 620, and line error determination circuit 625.

Modulo counter 615 is a cyclic counter with a modulus related to the number of facets on the mirror. In practice, the modulus may be the same number as, or one-half the number of, the number of facets on the mirror. It receives the signal from beam detector 610, and advances its count as the mirror rotates to a next facet. It thereby indicates when a particular facet is producing a line. The output of modulo counter 615 is a facet identification number that is routed to line error determination circuit 625 and line length correction circuit 630.

Period timer 620 receives the signal from beam detector 610. It determines a scan line length from a difference between a start time of a scan line produced from a facet and a start time of a scan line produced from a next facet. Period timer 620 provides the scan line length to line error determination circuit 625.

Line error determination circuit 625 receives the signal from beam detector 610, the facet identification number from modulo counter 615, and the scan line length from period timer 620. The signal from beam detector 610 alerts line error determination circuit 625 of the occurrence of a start of a line from a facet. Line error determination circuit 625 uses the facet identification number to associate the scan line length with the facet. For each of the facets, it determines a line length error as described earlier. The line length error is routed from line error determination circuit 625 to line length correction circuit 630.

Line length correction circuit 630 receives the facet identification number from modulo counter 615, and the line error from line error determination circuit 625. It determines a scan line length correction for the facet using a technique such as described earlier for FIG. 3, step 325. This process is executed for each of the facets on the mirror. Furthermore, since the facet identification number from modulo counter 615 indicates when a particular facet is producing a line, an appropriate correction is recalled and applied to compensate for the line error of the particular facet when the facet is producing a scan line.

System 600 can be implemented in hardware using discrete components or firmware. Alternatively, it can be implemented in software and stored into a memory 640 for execution by a processor 635. Furthermore, the procedures required to execute the present invention may be configured on a storage medium, such as storage media 645, for subsequent loading into memory 640. Storage media 645 can be any conventional storage media such as a magnetic tape, an optical storage media, a compact disk, or a floppy disk.

Figure 7:
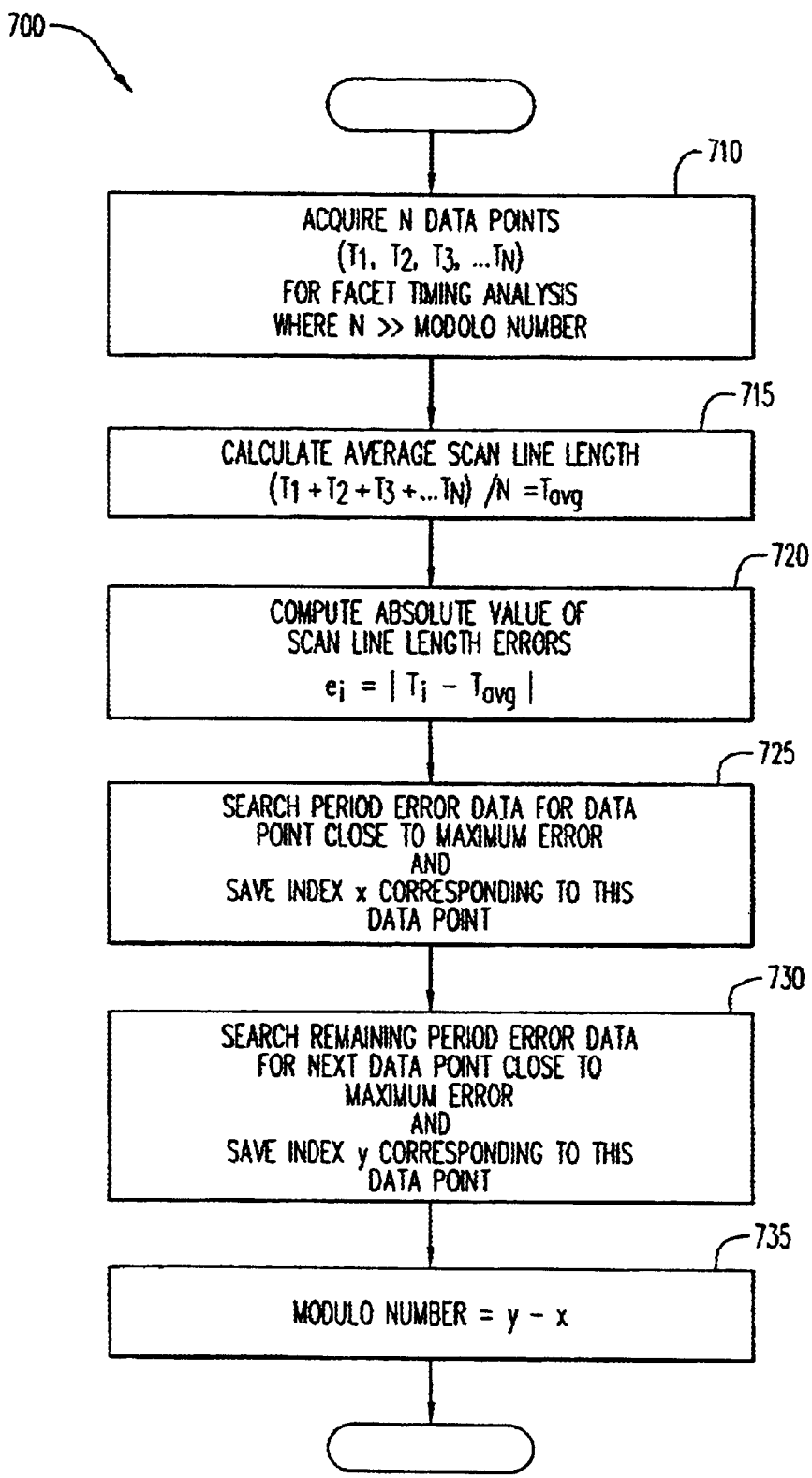
FIG. 7 is a flowchart of a method for determining a modulo number that indicates a number of facets on a polygon mirror in a scanning device.

FIG. 7 is a flowchart of a method 700 for determining a modulo number that indicates a number of facets on a rotating polygon mirror in a scanning device. As described below, the method includes the steps of: (a) acquiring N consecutive scan line lengths produced from the plurality of facets, where N is an integer substantially greater than an expected value of the modulo number, (b) calculating an average scan line length from the N scan line lengths, (c) calculating a set of error values for the N scan line lengths, through use of each of the N scan line lengths and the average scan line length, (d) determining from the set of error values an index X to a peak error value, and an index Y to a subsequent occurrence of a further peak error value, and (e) determining the modulo number from a difference between Y and X. The method begins with step 710.

In step 710, acquire N consecutive scan line lengths produced from the plurality of facets. A scan line length can be an interval either from the start of a scan line to an end of the scan line, or from the start of a scan line to a start of a next scan line. N is an integer substantially greater than an expected value of the modulo number. For example, if the mirror is expected to have six facets, then it has an expected modulo number of 6, and therefore substantially more than six consecutive scan line lengths are acquired. Further to the example, assume that 32 consecutive scan line lengths are acquired. The method then advances to step 715.

In step 715, calculate an average scan line length from the N scan line lengths. For example, calculate an average of the 32 scan line lengths. That is, $$(T_1+T_2+T_3+ \ldots +T_N)/N=T_{avg}$$

The method then advances to step 720.

In step 720, calculate a set of error values for the N scan line lengths, through use of each of the N scan line lengths and the average scan line length. More particularly, for each of the N scan line lengths, calculate an error value ($e_i$) as the absolute value of a difference between a scan line length acquired in step 710, and the average scan line length calculated in step 715. That is, for i=1 to N, $$e_i=|T_1-T_{avg}|$$

The method then advances to step 725.

In step 725, determine from the set of error values an index X to a peak error value. This step searches both positive and negative error values, and the peak error is that with the greatest magnitude. For example, index X is found by searching the set of error data for a maximum error. The method then advances to step 730.

In step 730, determine from the set of error values an index Y to a subsequent occurrence of a further peak error value. For example, index Y is found by searching the remaining error data for another error value approximately equal to the maximum error found in step 725. The method then advances to step 735.

In step 735, determine the modulo number from a difference between Y and X. That is, Modulo Number=Y–X For example, if peak errors are found at $e_3$ and $e_7$, then X=3 and Y=7, and Modulo Number=7–3

Modulo Number=4

In practice, the modulus may be the same number as, or one-half the number of, the number of facets on the mirror. If the modulus is found to be a value of one, or it is indeterminate, then the system may be regarded as having a very small relative error between facets, and as such, the effect of moiré will be insignificant.

A scanning system employing method 700 can determine the number of facets on a polygon mirror, and use the modulo number to control a cyclic counter that provides an output to identify each of the facets on a polygon mirror. For example, the modulo number can be loaded into a modulo counter, such as that described above and shown in FIGS. 4 and 6, to control the count at which the counter wraps.

Among the benefits of a scanning system employing method 700 is a reduced cost because it does not require a sensor to track any particular reference facet. Instead, a programmable modulo counter can be used for the cyclic counter. Note also that in existing systems that sense and track a particular reference facet, some form of counter is typically required. Therefore, the use of a programmable counter in the present invention does not necessarily increase the cost of a facet synchronization circuit.

Figure 8:
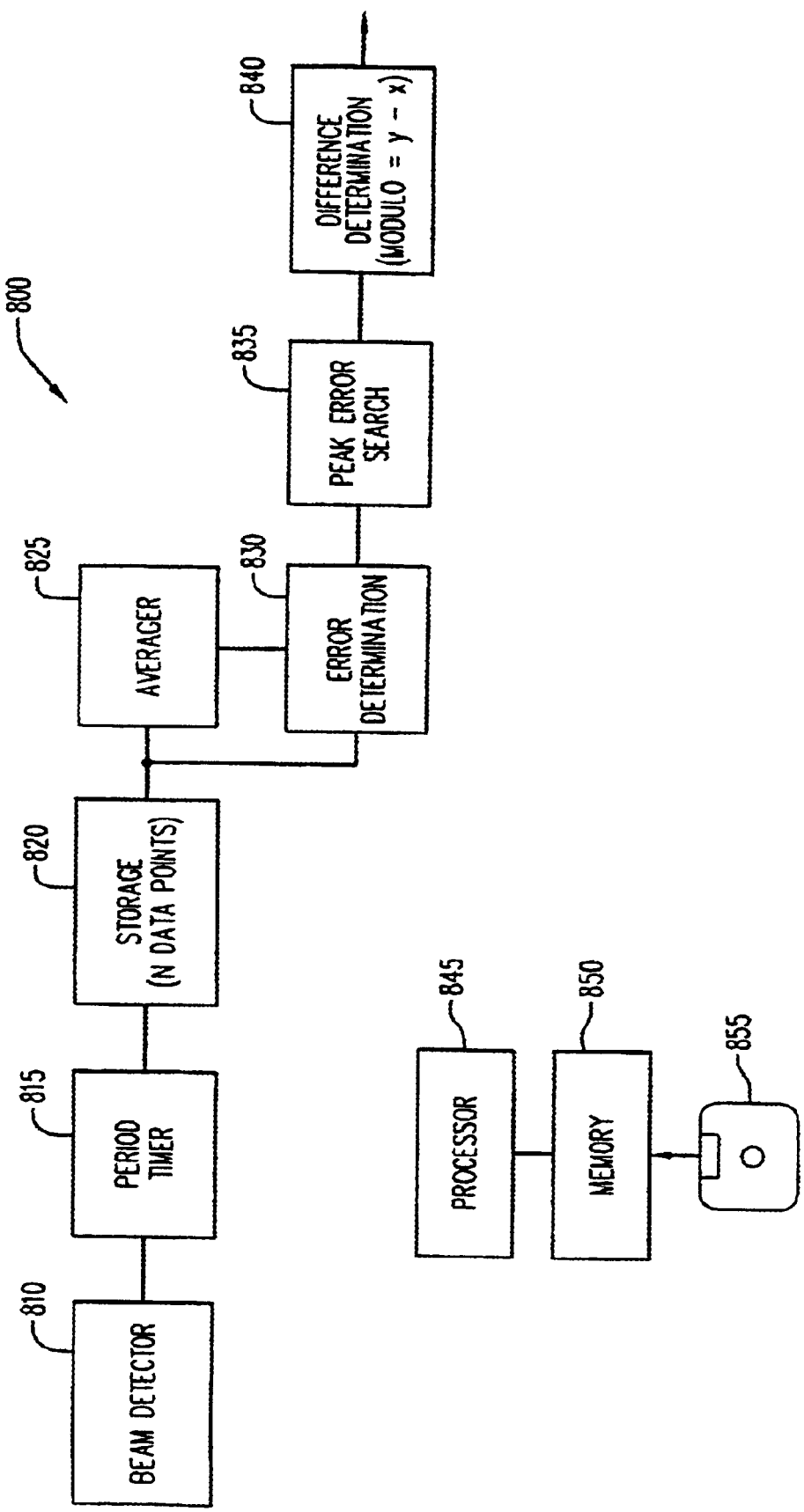
FIG. 8 is block diagram of a system for determining a modulo number by employing the method illustrated in FIG. 7.

FIG. 8 is block diagram of a system 800 for determining a modulo number by employing the method illustrated in FIG. 7. The modulo number indicates a number of facets on a rotating polygon mirror of a scanning device. As described below, such a system includes a processor for (a) acquiring N consecutive scan line lengths produced from a plurality of facets, wherein N is an integer substantially greater than an expected value of the modulo number, (b) calculating an average scan line length from the N scan line lengths, (c) calculating a set of error values for the N scan line lengths, through use of each of the N scan line lengths and the average scan line length, (d) determining from the set of error values an index X to a peak error value, and an index Y to a subsequent occurrence of a further peak error value, and (e) determining the modulo number from a difference between Y and X.

System 800 includes a beam detector 810, a period timer 815, a storage 820 for N data points, an averager 825, an error determination 830, a peak error search 835, and a difference determination 840. The system also includes a memory 850 for storage of data and instructions for controlling a processor 845. While the procedures required to execute the invention hereof are indicated as already loaded into memory 850, they may be configured on a storage medium, such as storage media 855, for subsequent loading into memory 850. Alternatively, rather than executing the procedures in processor 845, system 800 can be implemented in hardware using discrete components or firmware.

Beam detector 810 detects a light beam that produces a scan line, and provides an output signal. Beam detector 810 can be, for example, an apparatus such as that shown in FIGS. 1A and 1B that indicates a start and an end of the scan line, or an apparatus such as that shown in FIG. 9 that indicates only the start of a scan line. The output signal from beam detector 810 is routed to period timer 815.

Period timer 815 receives the signal from beam detector 810. It determines a scan line length from either a difference between a start time and an end time of a scan line produced from a facet, or from a difference between a start time of a scan line produced from a facet and a start time of a scan line produced from a next facet. Period timer 815 repeats this process to acquire N consecutive scan lines, where N is an integer substantially greater than an expected value of the modulo number. Period timer 815 writes the scan line length data into storage 820.

Storage 820 receives the scan line length data from period timer 815. It is an interim storage area for data representing the N scan line lengths. It provides access to its stored data to averager 825 and error determination 830.

Averager 825 accesses storage 820 to obtain the data for the N scan line lengths, and to calculate an average scan line length from the N scan line lengths. It provides the average scan line length to error determination 830.

Error determination 830 accesses storage 820 to obtain the data for the N scan line lengths, and it receives the average scan line length from averager 825. Error determination 830 calculates a set of error values for the N scan line lengths, through use of each of the N scan line lengths and the average scan line length. More particularly, for each of the N scan line lengths, it calculates an error value ($e_i$) as the absolute value of a difference between a scan line length and the average scan line length. The set of error values are presented to peak error search 835.

Peak error search 835 receives the set of error values from error determination 830. This component searches both positive and negative error values, and the peak error is that with the greatest magnitude. From the set of error values, it determines an index X to a peak error value, and an index Y to a subsequent occurrence of a further peak error value. Indices X and Y are provided to difference determination 840.

Difference determination 840 receives the X and Y indices from peak error search 835. It determines the modulo number from a difference between Y and X.

Modulo Number=Y–X

The modulo number can thereafter be used to control a cyclic counter that provides an output to identify each of the facets on a polygon mirror.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for determining a scan line length error for a scan line, wherein said scan line is produced from one of a plurality of facets of a rotating reflector of a scanning device, said method comprising the steps of:

determining a difference between a time of an occurrence of a point in a scan line produced from a first facet and a time of an occurrence of a point in a scan line produced from a second facet; and determining from said difference, a scan line length error for said scan line produced from said first facet.

2. The method of claim 1, wherein said point in said scan line produced from said first facet indicates a start of said scan line produced from said first facet, and wherein said point in said scan line produced from said second facet indicates a start of said scan line produced from said second facet.

3. The method of claim 1, further comprising determining from said scan line error for said scan line produced from said first facet, a correction for said scan line produced from said first facet.

4. The method of claim 1, further comprising obtaining a number from a cyclic counter to identify said first facet.

5. A system for determining a scan line length error for a scan line, wherein said scan line is produced from one of a plurality of facets of a rotating reflector of a scanning device, said system comprising:

a module for determining a difference between a time of an occurrence of a point in a scan line produced from a first facet and a time of an occurrence of a point in a scan line produced from a second facet; and a module for determining from said difference, a scan line length error for said scan line produced from said first facet.

6. The system of claim 5, wherein said point in said scan line produced from said first facet indicates a start of said scan line produced from said first facet, and wherein said point in said scan line produced from said second facet indicates a start of said scan line produced from said second facet.

7. The system of claim 5, further comprising a module for determining from said scan line error for said scan line produced from said first facet, a correction for said scan line produced from said first facet.

8. The system of claim 5, further comprising a cyclic counter that provides an output to identify said first facet.

9. A storage medium that contains instructions for controlling a processor that, in turn, determines a scan line length error for a scan line, wherein said scan line is produced from one of a plurality of facets of a rotating reflector of a scanning device, said storage medium comprising:

instructions for controlling said processor to determine a difference between a time of an occurrence of a point in a scan line produced from a first facet and a time of an occurrence of a point in a scan line produced from a second facet; and instructions for controlling said processor to determine from said difference, a scan line length error for said scan line produced from said first facet.

10. The storage medium of claim 9, wherein said point in said scan line produced from said first facet indicates a start of said scan line produced from said first facet, and wherein said point in said scan line produced from said second facet indicates a start of said scan line produced from said second facet.

11. The storage medium of claim 9, further comprising instructions for controlling said processor to determine from said scan line error for said scan line produced from said first facet, a correction for said scan line produced from said first facet.

12. The storage medium of claim 9, further comprising instructions for controlling said processor to obtain a number from a cyclic counter to identify said first facet.

13. A method for determining a correction for a scan line, wherein said scan line is produced from one of a plurality of facets on a rotating reflector of a scanning device, said method comprising the steps of:

determining a facet error from a difference between a length of a scan line produced from a first facet and a length of a scan line produced from a second facet; and determining from said facet error, a correction for said scan line produced from said first facet.

14. The method of claim 13, wherein said length of said scan line produced from said first facet is determined from a difference between an end time of said scan line produced from said first facet and a start time of said scan line produced from said first facet.

15. The method of claim 13, wherein said method further comprises the step of obtaining a number from a cyclic counter to identify said first facet.

16. A system for determining a correction for a scan line, wherein said scan line is produced from one of a plurality of facets on a rotating reflector of a scanning device, said system comprising:

a module for determining a facet error from a difference between a length of a scan line produced from a first facet and a length of a scan line produced from a second facet; and a module for determining from said facet error, a correction for said scan line produced from said first facet.

17. The system of claim 16, wherein said length of said scan line produced from said first facet is determined from a difference between an end time of said scan line produced from said first facet and a start time of said scan line produced from said first facet.

18. The system of claim 16, further comprising a cyclic counter that provides an output to identify said first facet.

19. A storage medium that contains instructions for controlling a processor that, in turn, determines a correction for a scan line, wherein said scan line is produced from one of a plurality of facets on a rotating reflector of a scanning device, said storage medium comprising:

instructions for controlling said processor to determine a facet error from a difference between a length of a scan line produced from a first facet and a length of a scan line produced from a second facet; and instructions for controlling said processor to determine from said facet error, a correction for said scan line produced from said first facet.

20. The storage medium of claim 19, wherein said length of said scan line produced from said first facet is determined from a difference between an end time of said scan line produced from said first facet and a start time of said scan line produced from said first facet.

21. The storage medium of claim 19, further comprising instructions for controlling said processor to obtain a number from a cyclic counter to identify said first facet.

* * * * *